United States Patent [19]

Arena et al.

[11] Patent Number: 4,541,880
[45] Date of Patent: Sep. 17, 1985

[54] METHOD OF MAKING OVERLAID PLYWOOD

[75] Inventors: Joseph W. Arena, Burnaby; Karle B. Gilson; David T. Malcolm, both of Vancouver; John A. R. Mellander, Maple Ridge, all of Canada

[73] Assignee: Crown Forest Industries Limited, Vancouver, Canada

[21] Appl. No.: 584,126

[22] Filed: Feb. 27, 1984

[30] Foreign Application Priority Data

Sep. 9, 1983 [CA] Canada .................................. 436397

[51] Int. Cl.⁴ .............................................. B32B 35/00
[52] U.S. Cl. ..................................... 156/94; 144/332; 156/330; 264/36; 427/140; 428/63
[58] Field of Search .................. 144/332; 156/94, 330; 264/36; 427/140; 428/63

[56] References Cited

U.S. PATENT DOCUMENTS

| | | |
|---|---|---|
| 2,337,792 | 12/1943 | Yokell . |
| 2,419,614 | 4/1947 | Welch . |
| 2,656,296 | 10/1953 | Grangaard . |
| 3,011,903 | 12/1969 | Clock et al. . |
| 3,155,558 | 11/1964 | Clapp .................................... 156/94 |
| 3,380,213 | 4/1968 | Hartman et al. . |
| 3,457,094 | 7/1969 | Elmendorf et al. . |
| 3,478,791 | 11/1969 | Elmendorf . |
| 3,547,170 | 12/1970 | Maxey . |
| 3,690,979 | 9/1972 | Jarvi . |
| 3,741,853 | 6/1973 | Forsythe et al. . |
| 3,844,863 | 10/1974 | Forsythe et al. . |

FOREIGN PATENT DOCUMENTS

| | | |
|---|---|---|
| 562106 | 8/1958 | Canada . |
| 576105 | 5/1959 | Canada . |
| 639575 | 4/1962 | Canada . |
| 667030 | 7/1963 | Canada . |
| 827452 | 11/1969 | Canada . |
| 1044082 | 12/1978 | Canada . |
| 1060622 | 8/1979 | Canada . |

OTHER PUBLICATIONS

Kreibich, "A New Filler is Developed for Plywood Patching", Plywood Magazine, Nov.–Dec., 1964.
Hy-Fil ® Technical Data Sheets A-800, A-801A, A-802; Hysol Corp., Olean, New York.
McCann, "Chemical Repairs in Plywood Panels", Southern Lumberman, vol. 229, No. 2848, 1974, pp. 126–130.

Primary Examiner—Robert A. Dawson
Attorney, Agent, or Firm—Limbach, Limbach & Sutton

[57] ABSTRACT

Overlaid plywood is made by filling surface defects on a plywood panel with a thermosetting resin; overlaying the filled surface(s) with sheet(s) of overlay paper and then compressing the panel, while heating the panel. Gluelines in the plywood veneer and in the overlay paper(s) are cured during the hot pressing operation, which also flattens and hardens the resin-filled defects to form a smooth-surfaced overlaid plywood panel.

43 Claims, 9 Drawing Figures

METHOD OF MAKING OVERLAID PLYWOOD

FIELD OF THE INVENTION

This application pertains to a method of making overlaid plywood in which a thermosetting resin is used to fill defects on the surface(s) of a plywood panel prior to the application of overlay paper to the panel surface(s).

BACKGROUND OF THE INVENTION

"Overlaid" plywood panels are manufactured by affixing sheet(s) of resin-impregnated fibre overlay paper to one, or both, sides of a plywood panel to impart a smooth surface to the finished panel. Overlaid plywood has a number of end uses including use in concrete formwork (where the paper overlaid side of the panel is positioned against a curing concrete surface to impart a smooth finish to the cured concrete); use in doors, liners, decks, siding or furniture surfaces where durable, paintable surfaces are desired; use in signwork (the paintable, overlay paper provides a surface which retains its smoothness and durability over time in exterior uses), etc.

Smooth, durable overlaid panel surfaces may only be produced if the plywood panel surface veneer underlying the overlay paper is smooth and free of defects. Surface variations as small as 0.008 inches may result in areas of low pressure to which overlay paper will not properly bond. It is therefore important, in the manufacture of overlaid plywood, to repair naturally occurring or man-made veneer surface defects. Such defects may include open knot holes, splits, holes made by worms or insects, pitch pockets, bark pockets, veneer roughness, chipped or solid knots, lathe marks, veneer shelling, impressions and splits and tears caused by handling or transport of the panels.

The present invention provides an improved method of making overlaid plywood in which panel surface defects are filled with a thermosetting resin before a sheet of resin-impregnated overlay paper is applied to the panel surface(s). (Either, or both, surfaces of a plywood panel may be overlaid in accordance with the invention.) The panel is then compressed and heated, thereby curing the gluelines on the plywood veneer and on the overlay paper and also thereby flattening and hardening the resin filler to form solid patches which are securely bonded to the overlay paper and to the underlying veneer and veneer glueline to produce a smooth-surfaced overlaid plywood panel.

SUMMARY OF THE INVENTION

Broadly speaking, the invention is directed to a method of making overlaid plywood comprising the steps of filling plywood panel veneer surface defects with a thermosetting resin, overlaying the filled surface(s) with sheet(s) of overlay paper and then compressing the panel, while heating the panel. Preferably, the panel is compressed at a pressure of from about 150 pounds per square inch to about 250 pounds per square inch and heated to a temperature of about 250° F. to about 350° F.

Advantageously, panel surface defects which extend to an edge of the side of the panel are blocked by applying tape (preferably, self-adhesive blown neoprene rubber tape) along the panel edges at such defects.

Preferably, the thermosetting resin used to fill surface defects on the panel is a compound containing epoxy, epoxide, oxirane or ethoxyline groups. Bis-epi resins, epoxy novolac resins and cycloaliphatic epoxies are particularly preferred resins.

Advantageously, prior to filling of veneer surface defects with thermosetting resin, a curing agent or catalyst which promotes cross-linking or homo polymerization of the resin is added thereto.

In a particular aspect, the invention provides a method of making overlaid plywood which comprises the steps of forming a plywood panel with layers of glued veneer, compressing the panel for a period normally ranging from about three minutes to about ten minutes, filling veneer surface defects on the panel with a thermosetting resin, overlaying the filled surface(s) with sheet(s) of overlay paper and then compressing the panel while heating the panel. Preferably, no more than about forty minutes are allowed to elapse between the two compressing steps and no more than about sixty minutes elapse between the time glue is applied to the veneers and the final compressing step.

In another aspect, the invention provides a method of making overlaid plywood comprising the steps of forming a plywood panel with layers of glued veneer, compressing the panel while heating the panel, cooling the compressed panel, then filling surface defects on the panel with a thermosetting resin, overlaying the filled surface(s) with sheet(s) of overlay paper and then compressing the panel while heating the panel.

DETAILED DESCRIPTION OF THE PREFERRED EMBODIMENT BACKGROUND

Figure 1:
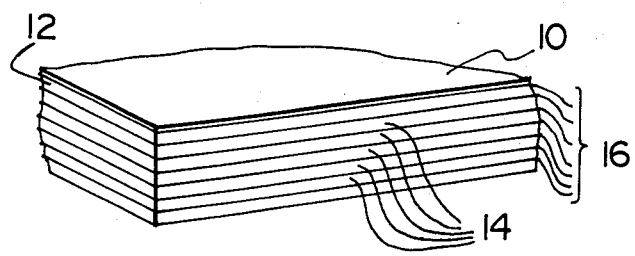
FIG. 1 is a fragmented, cross-sectional illustration of an overlaid plywood panel.

In the manufacture of overlaid plywood panels, layers of veneer ("plys") are commonly bonded together with a glue which incorporates phenol formaldehyde resin, fillers and water. One, or both, of the outer surfaces of the plywood panel may be covered with an overlay which is commonly made of phenolic resin saturated paper having a partially cured dry phenolic glueline on one surface. The plywood panel surface veneer(s) to which the overlay paper is applied must be smooth and free of open defects in order to produce a smooth, durable finished overlaid plywood panel. FIG. 1 illustrates the orientation of overlay paper 10, surface veneer 12, inner veneers 14, and phenolic gluelines 16 in a typical overlaid plywood panel having overlay paper applied to one surface thereof.

Prior to the application of overlay paper to the panel, defects on the panel surface(s) to which the overlay paper is to be applied must be repaired or eliminated. This is accomplished either by selecting defect-free veneers for the outer panel surface(s), or by repairing, prior to assembly of the panel, surface defects on the veneer sheet(s) selected to form the outer surface(s) of the panel, or by making the panel and then repairing veneer surface defects.

In the art the term "one step process" is commonly used to describe a method of making overlaid plywood panels in which the plywood panel veneers and overlay paper(s) are bonded together in a single step. This may be achieved either by selecting sheet(s) of defect free veneer to form the outer surface(s) of the panel to which the overlay paper(s) are to be applied, or by repairing veneer surface defects before assembling and overlaying the panel. The term "two step process" is commonly used in the art to describe a method of making overlaid plywood panels in which veneer surface defects are repaired after the plywood veneers are bonded together to form the plywood panel, but before the application of overlay paper to the panel surface(s). Thus, the two step process requires two bonding steps; in the first bonding step the plywood veneers are bonded together to form the plywood panel. In the second bonding step the overlay paper is bonded to the panel surface(s) after any veneer surface defects have been repaired.

A one step process would commonly be used by a plywood panel manufacturer if sufficient high grade (i.e. defect-free) veneers are available, because the number of process steps are reduced (as compared with the two step process), which results in a saving of labour. A plywood panel manufacturer who used the two step process would typically first produce non-overlaid plywood, then repair surface defects on the non-overlaid panels and apply overlay paper thereto. Because a "two step" plywood panel manufacturer thus does not require high grade veneers to make overlaid plywood, any available high grade veneers may be saved for making nonoverlaid plywood products.

PRIOR ART ONE STEP METHOD OF MAKING OVERLAID PLYWOOD

Figure 2:
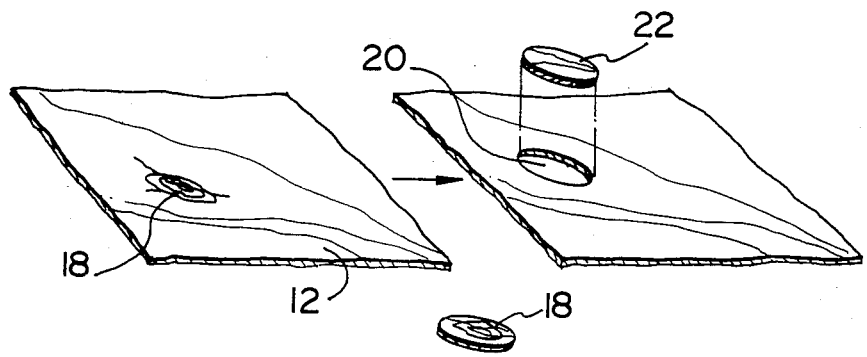
FIG. 2 illustrates a prior art method of repairing plywood veneer surface defects.
Figure 3:
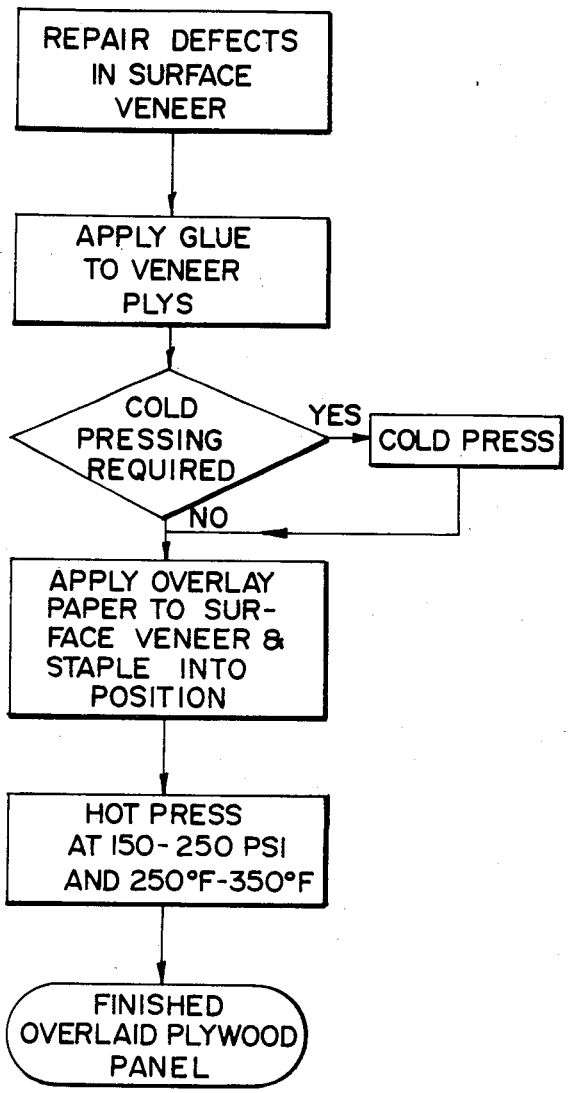
FIG. 3 is a flowchart which illustrates the major steps included in a prior art one step method of making overlaid plywood.

FIG. 3 is a flowchart which illustrates the major steps included in a typical prior art one step method of making overlaid plywood. This method begins with the repair of surface defects on the veneer sheet(s) selected to form the outer surface(s) of the panel to which the overlay paper is to be applied. Although there are a number of repair methods, those most commonly employed require that surface veneer sheet 12 be manipulated manually to align areas having surface defects (as shown at 18 in FIG. 2) under a punch which punches the defective area out of the veneer, leaving an aperture 20 therein. A defect-free veneer patch 22 (known in the art as a Raimann, Skoog, or Dogbone patch, depending upon the patch shape) having a shape which corresponds to the shape of punched aperture 20 and having a thickness corresponding to the thickness of surface veneer sheet 12 is then inserted into punched aperture 20 and may be taped or hot-melted into place.

After veneer surface defects have been repaired, the panel is then "laid up" by applying glue to the surfaces of the veneer sheets selected to form the panel. The veneer sheets are then layered one on top of the other with alternate grain orientation. (The veneer sheets used to form the plywood panel are commonly slightly larger than the dimensions of the finished panel. For example, veneer sheets measuring about 51 inches by about 102 inches are typically used to form a plywood panel having a finished dimension of 48 inches by 96 inches.)

After the plywood panel has been loosely assembled as aforesaid sheet(s) of phenolic resin saturated paper incorporating a heat curable dry phenolic glueline on one surface is then applied to the repaired, defect-free outer surface(s) of the panel. The paper is stapled to the panel (around the outer periphery of the panel in regions which will be trimmed away when the finished panel is cut to its final dimensioned size) in order to prevent misalignment of the paper. Splits or other defects caused by handling the panel during lay-up and assembly cannot be corrected and will reduce grade recovery of the finished panel.

A stack of assembled panels must then be quickly processed to prevent glue dry-out. The assembled panels, having overlay paper applied thereto as aforesaid, are separated from the stack and transferred, one at a time, between a pair of heated steel platens which are mechanically closed to exert pressure and heat on the panel. The panels are compressed at a pressure of from about 150 pounds per square inch to about 250 pounds per square inch and heated to a temperature of from about 250° F. to about 350° F. Panel dwell time between the press platens varies depending upon the number of veneer layers ("plys") comprising the panel and depending upon the press temperature. Typically, seven minutes are required to compress a seven ply panel at a temperature of 285° F. in order to ensure intimate contact of the glued veneer surfaces and heat curing of the veneer and overlay gluelines. The total time span between panel lay-up and hot pressing of the panel should not exceed twenty minutes or the veneer gluelines may become too dry, resulting in poor bonding of the panel veneers. As a variation, application of the overlay paper to the panel surface may be deferred until just before the panels are hot pressed.

An alternative prior art one step method of making overlaid plywood includes a "cold pressing" step after the panels have been loosely laid up but before overlay paper is applied thereto. A stack of loosely assembled panels (typically about twenty panels) is placed between a pair of nonheated steel platens (the "cold press") which are then mechanically closed to exert a pressure of from about 150 pounds per square inch to about 250 pounds per square inch on the stack of panels, thereby ensuring intimate contact of glued surfaces and elimination of air pockets which may dry out veneer gluelines. After about three to ten minutes of such cold pressing, the stack of panels is removed from the press and the panels are separated to enable the application and stapling of sheet(s) of overlay paper to the pre-repaired defect-free surface(s) of each panel. The panels are then separately hot pressed as described above. The time taken between panel lay-up and cold pressing of the panel stack should not exceed from about three to twenty minutes. The time taken between completion of the cold pressing operation and commencement of the hot pressing operation should not exceed from about ten to thirty minutes. It may be seen that the cold pressing operation may extend the total panel assembly time by as much as forty minutes.

PRIOR ART TWO STEP METHOD OF MAKING OVERLAID PLYWOOD

Figure 6:
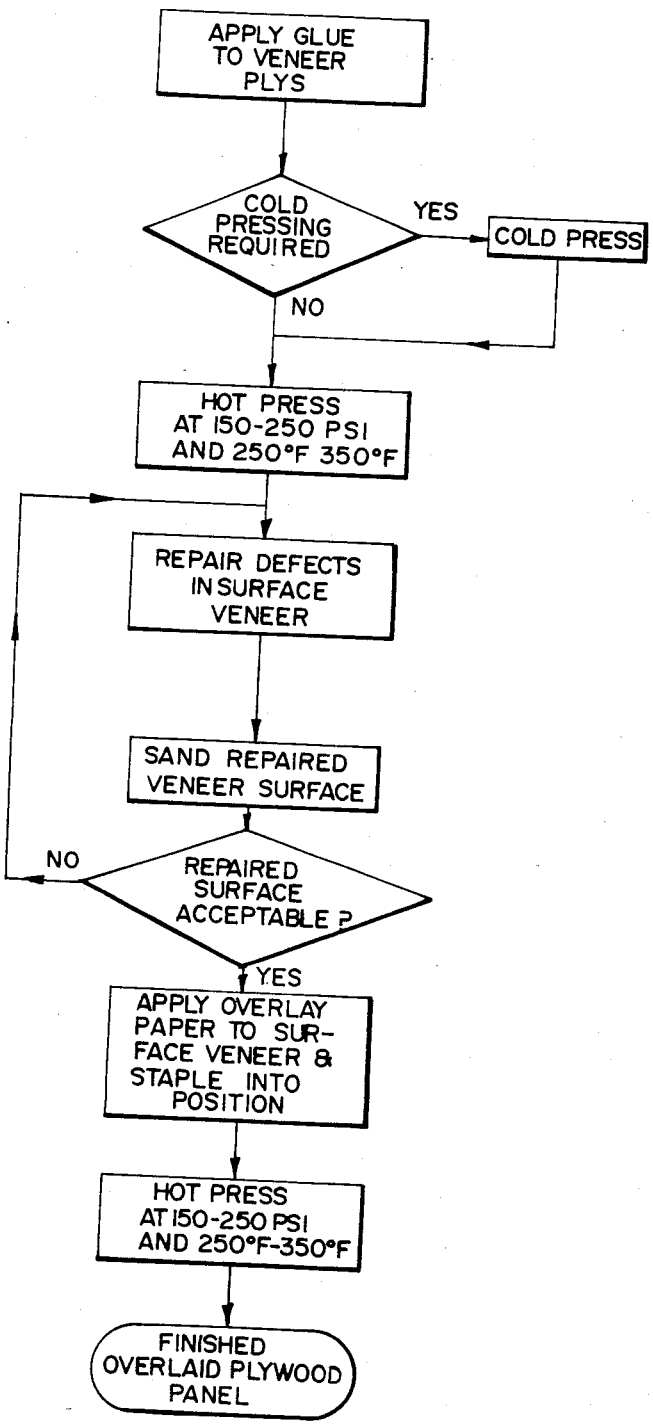
FIG. 6 is a flowchart which illustrates the major steps included in a prior art two step method of making overlaid plywood.

The commonly used prior art two step method of making overlaid plywood includes two hot pressing steps. In the first hot pressing step the glued plywood veneers are bonded together to form a plywood panel. In the second hot pressing step the overlay paper(s) are bonded to the panel surface(s). FIG. 6 is a flowchart which illustrates the major steps included in a prior art two step method of making overlaid plywood.

In the prior art two step method, surface veneer defects are typically not repaired until after completion of the first hot pressing operation. Panel lay-up and the first hot pressing operation proceed in a manner similar to that described above with reference to the prior art one step method, except that sheets of overlay paper are not utilized. After the first hot pressing operation, panels having surface veneer defects are repaired by one of several methods. Surface defects may for example be removed by routing out the defective area to form a preselected shape on the panel surface. The routing operation removes the exposed cured phenolic glueline by cutting into the veneer ply beneath the outer surface veneer. Glue is then applied to the routered defect area and a defect free veneer patch of similar dimensions to the routered area is inserted. The glueline may be air dried or the patch may be subjected to heat and pressure to cure the glue. The entire panel surface must then be sanded to yield a smooth surface over the repaired area since the veneer patch normally protrudes slightly above the panel surface.

Figure 4:
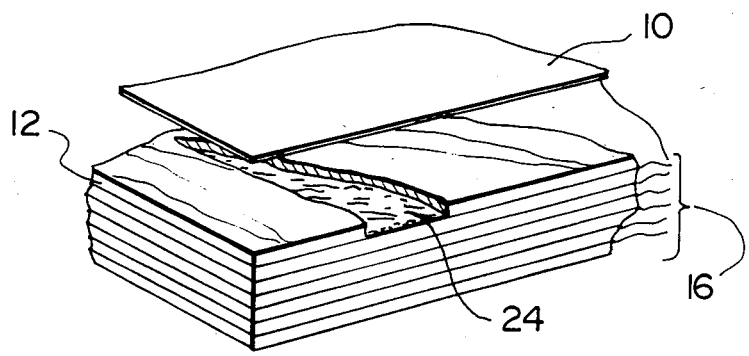
FIG. 4 (which appears on the same sheet of drawings as FIGS. 1 and 2) illustrates a common surface defect encountered in a prior art two step method of making overlaid plywood.
Figure 5:
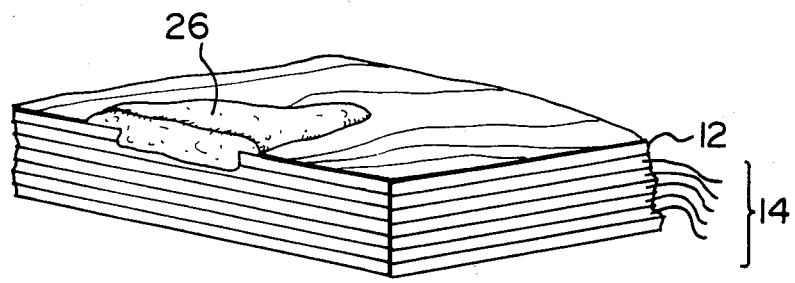
FIG. 5 illustrates a prior art technique for patching veneer surface defects of the type shown in FIG. 4.

FIG. 4 illustrates another method of repairing surface defects in the prior art two step method which involves routing the defective area 24 to remove exposed, cured phenolic glue and the defect. The routered area is then filled with a liquid synthetic patch material 26 (as shown in FIG. 5), commonly a urethane or polyester, which cures rapidly and forms a solid patch in the routered area. The defective area is normally overfilled with patch material, as shown in FIG. 5 and must therefore be sanded after the patch material has hardened in order to produce a smooth panel surface.

Yet another method of repairing surface defects in the prior art two step method involves the use of cellulose-based putty to fill small narrow splits or small open defects. This method however is restricted to very small surface defects due to the low strength of the patch material and its inability to securely bond to cured phenolic glue. Again, the panel surface must be sanded to remove excess putty protruding above the panel surface in order to provide a smooth surface on the panel.

Typically, routering of defective areas is preferred in order to ensure that exposed phenolic glue-line is removed from the defective area. This is because commonly used adhesives, fillers and putties do not form a chemical bond with cured phenolic glue. If such commonly used adhesives, fillers and putties are applied to cured phenolic glue a low strength patch results which may be easily dislodged from the panel surface. FIG. 4 illustrates the location of exposed cured phenolic glue at defective area 24, prior to routering and prior to the application of overlay paper 10 the panel surface veneer 12.

After surface defect repairs and sanding of the panel surface(s) the panels must be graded to identify those which may require further repairs. Overlay paper is applied and stapled to defect-free panels, which are then transferred to a hot press in order to bond the overlay glueline to the repaired panel, thereby forming a smooth durable finish.

PREFERRED EMBODIMENT OF ONE STEP METHOD FOR MAKING OVERLAID PLYWOOD

Figure 8:
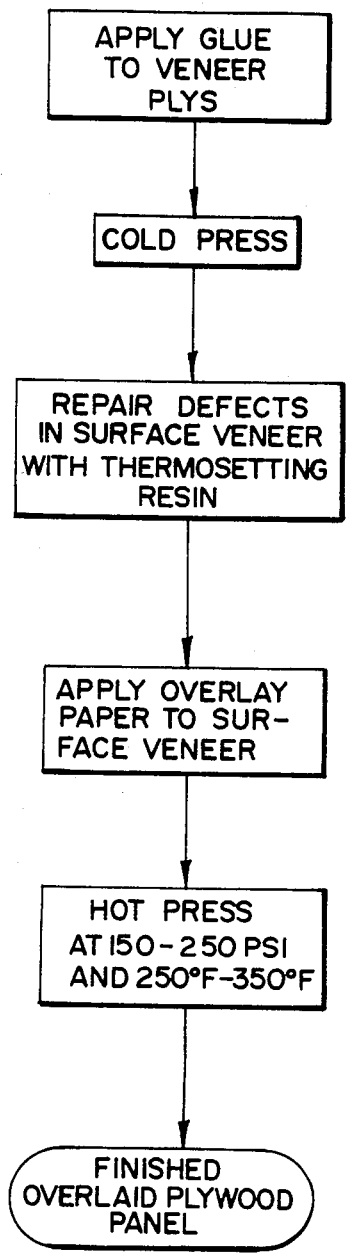
FIG. 8 is a flowchart which illustrates the major steps included in a one step method of making overlaid plywood according to the invention.

FIG. 8 is a flowchart which illustrates the major steps included in a one step method of making an overlaid plywood panel according to the preferred embodiment.

Glue (commonly phenol formaldehyde) is applied to plywood veneer surfaces ("plys") which are then layered one on top of the other with alternating grain orientation to form a stack of loosely assembled plywood panels. Surface veneers to which overlay paper is to be bonded are left with defects unrepaired. The stack of assembled panels is then transferred between the platens of a cold press which are mechanically closed to exert a pressure of from about 150 pounds per square inch to about 250 pounds per square inch on the stack of assembled panels, thereby ensuring intimate contact of glued veneer surfaces and exclusion of air pockets from the gluelines. The panel stack is compressed as aforesaid for about three to ten minutes, dwell time in the press varying to ensure that the glue will become tacky but not excessively dry. The cold pressing operation ensures that the panel veneers are consolidated together sufficiently to enable separation of the panels from one another without disturbing the panel veneer plys.

Figure 7:
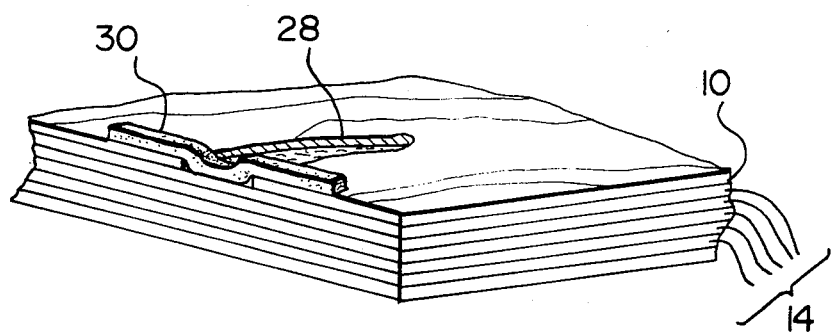
FIG. 7 (which appears on the same sheet of drawings as FIG. 5) illustrates the use, in the preferred embodiment of the invention, of tape to block veneer surface defects which extend to an edge of a plywood panel.

Surface defects on the separated panels are then filled with a liquid thermosetting resin. As shown in FIG. 7, surface defects 28 which extend to the edges of the panel sides are blocked with self-adhesive blown neoprene rubber tape 30 to prevent loss of the liquid resin filler. The neoprene tape is preferably about twice the thickness of the veneer surface sheet. Overlay paper is then applied to the panel surface(s) while the resin filler remains in its liquid state. The application of overlay paper to the panel surfaces enables the panels to be restacked without the transfer of resin filler between adjacent panel surfaces. The stack of repaired, overlaid panels is then transferred to a hot press and the panels are fed, one by one, between the heated press platens.

No more than about thirty minutes should elapse between the cold pressing and hot pressing steps in order to prevent excessive drying of the veneer gluelines. During the hot pressing operation the panels are compressed at a pressure of from about 150 pounds per square inch to about 250 pounds per square inch. The press platens are smooth and therefore ensure that any excess thermosetting resin is spread out evenly between the veneer surface and the overlay paper, while also ensuring intimate contact between adjacent veneer surfaces. The hot pressing operatin also squeezes any neoprene tape on the panel surface into the underlying defect area. The press temperature, which is preferably from about 250° F. to about 350° F., ensures curing and hardening of the thermosetting resin filler material and of the phenolic gluelines between the veneer plys and on the overlay sheet.

PREFERRED EMBODIMENT OF TWO STEP METHOD OF MAKING OVERLAID PLYWOOD

Figure 9:
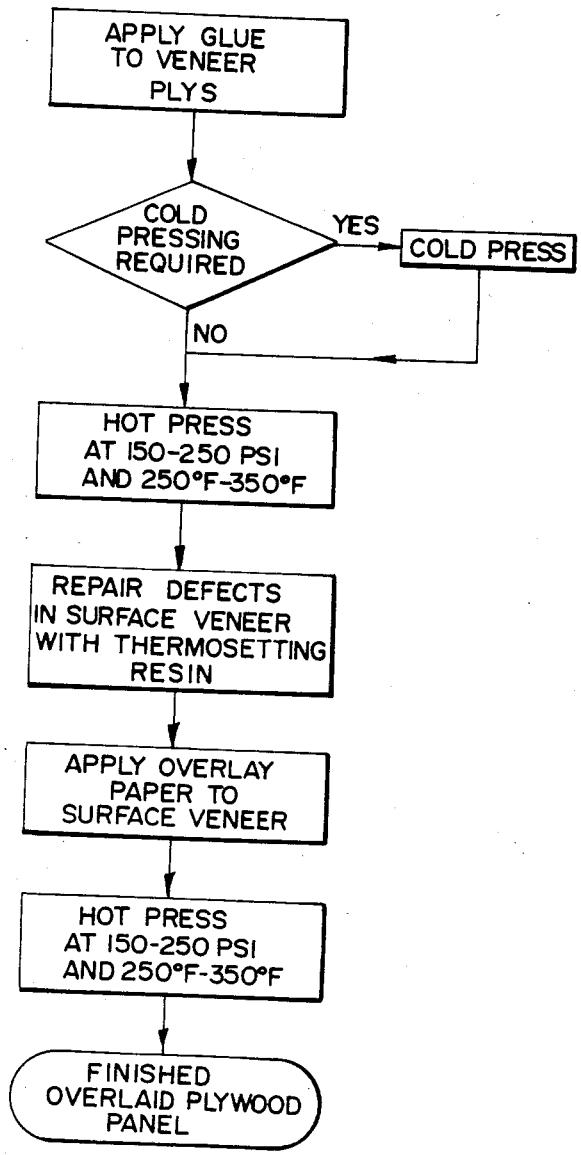
FIG. 9 is a flowchart which illustrates the major steps included in a two step method of making overlaid plywood according to the invention.

FIG. 9 is a flowchart which illustrates the major steps included in a two step method of making overlaid plywood according to the preferred embodiment.

As in the prior art two step process, two hot pressing steps are involved. During the first hot pressing step the glued plywood veneers are bonded together to form plywood panels. During the second hot pressing step the overlay paper is bonded to the veneer surface(s) and the thermosetting resin filler material used to repair veneer surface defects is cured.

Panel lay-up and the first hot pressing step included in the two step process are similar to those described above with respect to the one step method of making overlaid plywood according to the preferred embodiment, except that overlay paper and thermosetting resin filler material are not used and the cold pressing step may be eliminated.

After completion of the first hot pressing step the panels must be cooled to about 110° F. to prevent temperature interference with the preferred thermosetting resin filler material or with the heat sensitive glueline on the overlay paper. Typically, about three to four days are required to cool a stack of panels after the first hot pressing operation. After the cooling period, the panels are separated from the stack and surface veneer defects filled with a liquid thermosetting resin filler material. Defects which extend to the panel edges are blocked with self-adhesive blown neoprene rubber tape to prevent the loss of liquid filler material. Overlay paper is then applied to the panel surfaces and the panels are restacked. The stack of repaired panels is then transferred to a hot press and the panels are fed into the hot press one at a time. In the hot press, the panels are compressed at a pressure of from about 150 pounds per square inch to about 250 pounds per square inch and heated to a temperature of from about 250° F. to about 350° F. The pressure applied to the panels through the smooth surfaced hot press platens spreads out excess thermosetting filler material between the overlay paper and veneer surface. Heat applied during the hot pressing operation cures and hardens the thermosetting filler material and the phenolic glueline on the overlay paper.

The elapsed time between the application of thermosetting resin filler material to defects on the panel surface and commencement of the hot pressing operation depends upon the gel time of the thermosetting resin filler material which is used. The preferred thermosetting resin filler material (hereinafter described in greater detail) may be left on the panel surface for up to about sixty minutes prior to commencement of the hot pressing operation.

PREFERRED THERMOSETTING RESIN FILLER MATERIAL

To ensure the production of strong, smooth-surfaced overlaid plywood panels, a thermosetting resin filler material having a number of chemical and physical characteristics must be selected. These characteristics include characteristics of the resin filler material prior to curing thereof and characteristics thereof after curing of the filler material by the application of heat.

Preferred pre-cured characteristics of the thermosetting resin filler material include:

(a) high room temperature viscosity which enables slight overfilling of veneer surface defects without run-off of the resin filler material.

(b) the ability to use temperature control to modify the viscosity of the filler material, thereby facilitating pumping, metering and mixing of the filler material.

(c) an absence of volatile materials, to ensure that no vapours are emitted or solvents trapped between the overlay paper and surface veneer during curing of the filler material in the hot press. Vapour pressure build-up during the curing operation might blister the panel surface or result in shrinkage at the patch site.

(d) fast gel time, which allows the filler material to cure before it is absorbed into the porous overlay paper during the hot pressing operation.

(e) high tack to prevent the overlay paper from moving on the veneer surface, thereby eliminating the need to staple the overlay paper to the veneer surface.

(f) the ability to cure at temperatures and times which are within the range of temperatures and times commonly required to cure glues used in prior art methods of making overlaid plywood.

(g) the ability to bond to cured and curing phenolic gluelines, which eliminates the need to router defect areas prior to application of the filler material.

(h) the ability to bond to curing dry phenolic gluelines on the overlay paper.

Preferred post-cured characteristics of the thermosetting resin filler material include:

(a) resistance to boiling water, which allows the filler material to withstand standard product quality tests for filler materials.

(b) moisture resistance, which ensures long-term service of the finished overlaid plywood panel in exterior use conditions.

(c) high tensile strength, impact resistance and hardness without brittleness, which results in good machinability and product service life.

(d) alkali resistance, which allows use of the finished panel in concrete formwork.

(e) temperature resistance, to allow use of the finished panel in concrete forms and other outdoor applications.

(f) good weatherability to ensure long-term service in exterior uses.

Preferred thermosetting resin filler materials are compounds which contain the epoxy, epoxide, oxirane or ethoxyline groups. Bis-epi resins, epoxy novolac resins and cycloaliphatic epoxies are particularly preferred. Curing agents or catalysts which promote cross linking or homo polymerization may be added to the thermosetting resin filler material before it is applied to the veneer surface. Preferred curing agents or catalysts may contain primary and secondary amine groups, lewis acids, acid anhydrides or lewis bases. The mixing ratios will, of course, vary depending upon the specific epoxy used. One or two part epoxies may be utilized. One part epoxies require high temperature curing over extended time intervals. Two part epoxies may be cured at room temperature (over an extended time period) or relatively quickly at elevated temperatures.

An inorganic filler such as calcium carbonate is preferably added to the resin and catalyst (prior to mixing of the resin filler material and catalyst) in order to reduce shrinkage, build viscosity and prevent excessive wetting of the veneer surface and overlay paper during the hot pressing operation.

A suitable thermosetting resin filler material may be obtained from H. B. Fuller Canada Inc., Montreal Quebec, Canada, under the product identification number FA 532, parts A and B. This epoxy requires A to B component mixing ratios of 1:1 and rigorous mixing to achieve complete cure. Viscosities of both components are 45,000 c.p.s. at 70° F. Gel time for a 150 gram mass of mixed material at 70° F. is about seven minutes. Chemical composition of the A component is epoxy resin and 1, 3-benzenediol accelerator. Calcium carbonate filler is preferably added to the A component resin so as to obtain 28% by weight of filler. Chemical composition of the B component is diethylene triamine and/or aminoethyl piperazine and/or diethylaminopropylamine with a dibutyl phthalate and/or nonyl phenol and/or dinonyl phenol diluents. Calcium carbonate filler is also preferably added to the B component chemicals so as to obtain 47% by weight of filler.

APPLICATION OF THERMOSETTING RESIN FILLER MATERIAL TO VENEER SURFACE

The preferred thermosetting resin filler material is preferably metered, mixed and dispensed for proper application to the veneer surface. Manual, mechanical or a combination of manual and mechanical methods may be employed. For example, the filler material may be manually metered (measured), mixed and applied to the panel surface. Alternatively, the filler material may be mechanically metered and mixed and then applied to the panel surface with a manually operated dispenser. As a further alternative, mechanical metering and mixing may be used and a defect sensor-activated automated dispenser used to apply the metered, mixed filler material to the panel surface. Yet another alternative would be to mechanically meter and mix the filler material and then coat the entire panel surface with filler material in order to fill defects and also provide a glueline for the overlay paper.

ADVANTAGES OF THE PREFERRED EMBODIMENT

The one and two step methods of the preferred embodiment hereinbefore described offer a number of advantages over prior art methods of making overlaid plywood. Specifically, the methods of the preferred embodiment eliminate the need for a separate veneer repairing process and the attendant labour and machinery, thereby reducing material flow, and labour and energy costs. The preferred embodiment also eliminates the need to router exposed phenolic gluelines since the preferred thermosetting resin filler material bonds well to exposed phenolic glueline. The methods of the preferred embodiment also improve wood utilization by permitting the construction of thinner panels through the elimination of sanding of repaired surface veneers.

The preferred embodiment methods also represent a significant saving of labour in the manufacture of overlaid plywood panels in that the hot press is utilized not just to bond the panel and overlay paper together but also to smooth out and cure the thermosetting resin defect repair filler material. Further, the preferred thermosetting resin filler material provides a chemically and physically durable patch having improved resistance to wearing as compared with other commonly utilized patching materials.

The methods of the preferred embodiment also improve grade recovery of finished overlaid plywood panels by deferring the surface defect repairing operation until a relatively late stage in the manufacturing process, thereby facilitating the repair of defects caused during panel lay-up and assembly. The methods of the preferred embodiment also improve utilization of veneer grades, since lower quality veneers that would normally have to be used in the prior art two step method may be upgraded for use in the one step method of the preferred embodiment.

The prior art one step method of making overlaid plywood requires a relatively high veneer grade due to the limitations inherent in prior art veneer patching techniques. The supply of high grade veneers is limited and their cost is high. Therefore, production is normally limited by the supply of high grade veneers. The method of the preferred embodiment permits the upgrading of lower quality, lower cost veneers without limiting panel production, thereby increasing flexibility and productivity.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

We claim:

1. A method of making overlaid plywood, comprising the steps of:
   (a) filling surface defects on a side of a plywood panel with a thermosetting resin;
   (b) overlaying said side with a sheet of overlay paper while said resin remains in the liquid state; and,
   (c) compressing said panel while heating said panel.

2. A method as defined in claim 1, wherein said compressing step comprises compressing said panel at a pressure of from about 150 pounds per square inch to about 250 pounds per square inch.

3. A method as defined in claim 2, wherein said heating step comprises heating said panel to a temperature of from about 250° F. to about 350° F.

4. A method as defined in claim 1, further comprising, prior to said filling step, blocking surface defects which extend to an edge of said panel side by applying tape along said edges, at said defects.

5. A method as defined in claim 4, wherein said tape is blown neoprene rubber tape.

6. A method as defined in claim 1, 2 or 3, wherein said resin is selected from the group consisting of:
   (i) epoxies;
   (ii) epoxides;
   (iii) oxiranes; and,
   (iv) ethoxylines.

7. A method as defined in claim 1, 2 or 3, wherein said resin is selected from the group consisting of:
   (i) bis-epi resins;
   (ii) epoxy novolac resins; and,
   (iii) cycloaliphatic epoxies.

8. A method as defined in claim 1, 2 or 3 further comprising, prior to said filling step, adding to said resin a curing agent or catalyst which promotes cross linking or homo polymerization of said resin.

9. A method as defined in claim 1, 2 or 3 further comprising, prior to said filling step, adding to said resin a curing agent or catalyst selected from the group consisting of:

(i) primary and secondary amines;
(ii) lewis acids;
(iii) acid anhydrides; and,
(iv) lewis bases.

10. A method as defined in claim 1, 2 or 3 further comprising, prior to said filling step, adding to said resin a calcium carbonate filler.

11. A method as defined in claim 1, 2 or 3 wherein said resin is a two part expoxy resin, the first part thereof comprising epoxy resin and 1, 3- benzenediol accelerator; the second part thereof including compounds selected from the group consisting of:
(i) diethylene triamine;
(ii) aminoethyl piperazine;
(iii) diethylaminopropylamine with a dibutyl phthalate;
(iv) nonyl phenol; and,
(v) dinonyl phenol diluents.

12. A method of making overlaid plywood, comprising the steps of:
(a) forming a plywood panel with layers of glued veneer;
(b) compressing said panel for a period of from about three minutes to about ten minutes;
(c) filling surface defects on a side of said panel with a thermosetting resin;
(d) overlaying said side with a sheet of overlay paper while said resin remains in the liquid state; and,
(e) compressing said panel while heating said panel.

13. A method as defined in claim 12, wherein said compressing steps comprise compressing said panel at a pressure of from about 150 pounds per square inch to about 250 pounds per square inch.

14. A method as defined in claim 13, wherein said heating step comprises heating said panel to a temperature of from about 250° F. to about 350° F.

15. A method defined in claim 12, 13 or 14 wherein no more than about thirty minutes elapse between said conpressing steps.

16. A method as defined in claim 14, further comprising, prior to said filling step, blocking surface defects which extend to an edge of said panel side by applying tape along said edges, at said defects.

17. A method as defined in claim 16, wherein said tape is blown neoprene rubber tape.

18. A method as defined in claim 12, 13 or 14 wherein said resin is selected from the group consisting of:
(i) epoxies
(ii) epoxides;
(iii) oxiranes; and,
(iv) ethoxylines.

19. A method as defined in claim 12, 13 or 14, wherein said resin is selected from the group consisting of:
(i) bis-epi resins;
(ii) epoxy novolac resins; and,
(iii) cycloaliphatic epoxies.

20. A method as defined in claim 12, 13 or 14, further comprising, prior to said filling step, adding to said resin a curing agent or catalyst which promotes cross linking or homo polymerization of said resin.

21. A method as defined in claim 12, 13 or 14 further comprising, prior to said filling step, adding to said resin a curing agent or catalyst selected from the group consisting of:
(i) primary and secondary amines;
(ii) lewis acids;
(iii) acid anhydrides; and,
(iv) lewis bases.

22. A method as defined in claim 12, 13 or 14 further comprising, prior to said filling step, adding to said resin a calcium carbonate filler.

23. A method as defined in claim 12, 13 or 14 wherein said resin is a two part epoxy resin, the first part thereof comprising epoxy resin and 1, 3-benzenediol accelerator; the second part thereof including compounds selected from the group consisting
(i) diethylene triamine;
(ii) aminoethyl piperazine;
(iii) diethylaminopropylamine with a dibutyl phthalate;
(iv) nonyl phenol; and,
(v) dinonyl phenol diluents.

24. A method as defined in claim 1, 2 or 3, wherein no more than about sixty minutes elapse between said filling step and said compressing step.

25. A method of making overlaid plywood, comprising the steps of:
(a) forming a plywood panel with layers of glued veneer;
(b) compressing said panel while heating said panel;
(c) cooling said panel;
(d) filling surface defects on a side of said panel with a thermosetting resin;
(e) overlaying said side with a sheet of glue-impregnated overlay paper while said resin remains in the liquid state; and,
(f) compressing said panel while heating said panel.

26. A method as defined in claim 25, wherein said cooling step comprises cooling said panel to about 110° F.

27. A method as defined in claim 26, wherein said compressing steps comprise compressing said panel at a pressure of about 150 pounds per square inch to about 250 pounds per square inch.

28. A method as defined in claim 27, wherein said heating steps comprise heating said panel to a temperature of about 250° F. to about 350° F.

29. A method as defined in claim 25, 27 or 28 wherein no more than about sixty minutes elapse between said filling step and said second compressing step.

30. A method as defined in claim 25, further comprising, prior to said filling step, blocking surface defects which extend to an edge of said panel side by applying tape along said edges, at said defects.

31. A method as defined in claim 30, wherein said tape is blown neoprene rubber tape.

32. A method as defined in claim 25, 27 or 28, wherein said resin is selected from the group consisting of:
(i) epoxies;
(ii) epoxides;
(iii) oxiranes; and,
(iv) ethoxylines.

33. A method as defined in claim 25, 27 or 28, further comprising, prior to said filling step, adding to said resin a curing agent or catalyst which promotes cross linking or homo polymerization of said resin.

34. A method as defined in claim 25, 27 or 28, further comprising, prior to said filling step, adding to said resin a curing agent or catalyst selected from the group consisting of:
(i) primary and secondary amines;
(ii) lewis acids;
(iii) acid anhydrides; and,
(iv) lewis bases.

35. A method as defined in claim 25, 27 or 28, further comprising, prior to said filling step, adding to said resin a calcium carbonate filler.

36. A method as defined in claim 25, 27 or 28, wherein said resin is a two part epoxy resin, the first part thereof comprising epoxy resin and 1, 3-benzenediol accelerator; the second part thereof including compounds selected from the group consisting of:
  (i) diethylene triamine;
  (ii) aminoethyl piperazine;
  (iii) diethylaminopropylamine with a dibutyl phthalate;
  (iv) nonyl phenol; and,
  (v) dinonyl phenol diluents.

37. A method of making overlaid plywood, comprising the steps of:
  (a) applying thermosetting resin to a side of a plywood panel;
  (b) overlaying said side with a sheet of overlay paper while said resin remains in the liquid state; and,
  (c) compressing said panel while heating said panel.

38. A method as defined in claim 37, wherein said resin is selected from the group consisting of:
  (i) epoxies;
  (ii) epoxides;
  (iii) oxiranes; and,
  (iv) ethoxylines.

39. A method as defined in claim 37, wherein said resin is selected from the group consisting of:
  (i) bis-epi resins;
  (ii) epoxy novolac resins; and,
  (iii) cycloaliphatic epoxies.

40. A method as defined in claim 37, further comprising, prior to said applying step, adding to said resin a curing agent or catalyst which promotes cross linking or homo polymerization of said resin.

41. A method as defined in claim 37, further comprising, prior to said applying step, adding to said resin a curing agent or catalyst selected from the group consisting of:
  (i) primary and secondary amines;
  (ii) lewis acids;
  (iii) acid anhydrides; and,
  (iv) lewis bases.

42. A method as defined in claim 41 further comprising, prior to said applying step, adding to said resin a calcium carbonate filler.

43. A method as defined in claim 37, wherein said resin is a two part epoxy resin, the first part thereof comprising epoxy resin and 1, 3-benzenediol accelerator; the second part thereof including compounds selected from the group consisting of:
  (i) diethylene triamine;
  (ii) aminoethyl piperazine;
  (iii) diethylaminopropylamine with a dibutyl phthalate;
  (iv) nonyl phenol; and,
  (v) dinonyl phenol diluents.

* * * * *